March 14, 1933.  A. LACK  1,901,175
CRANK SHAFT
Filed April 1, 1931
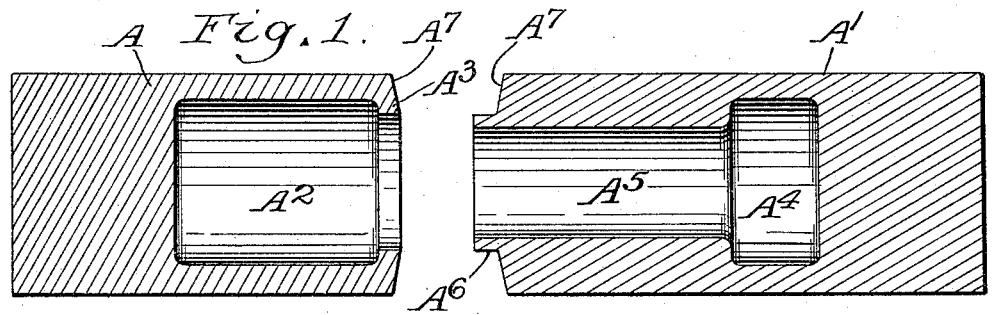
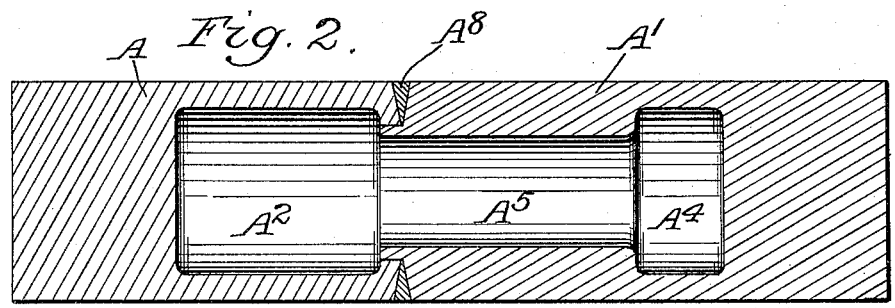
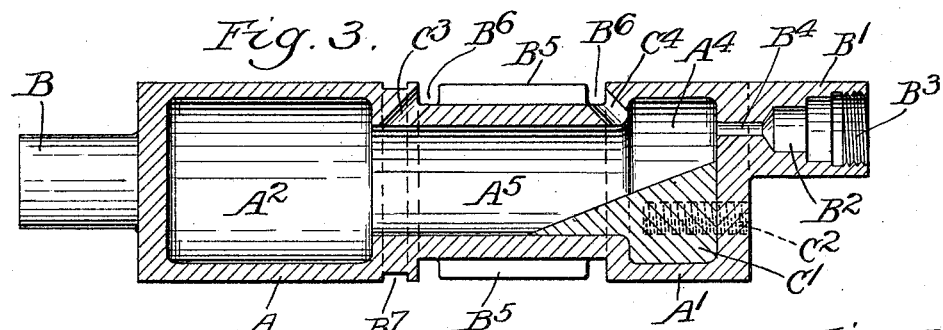
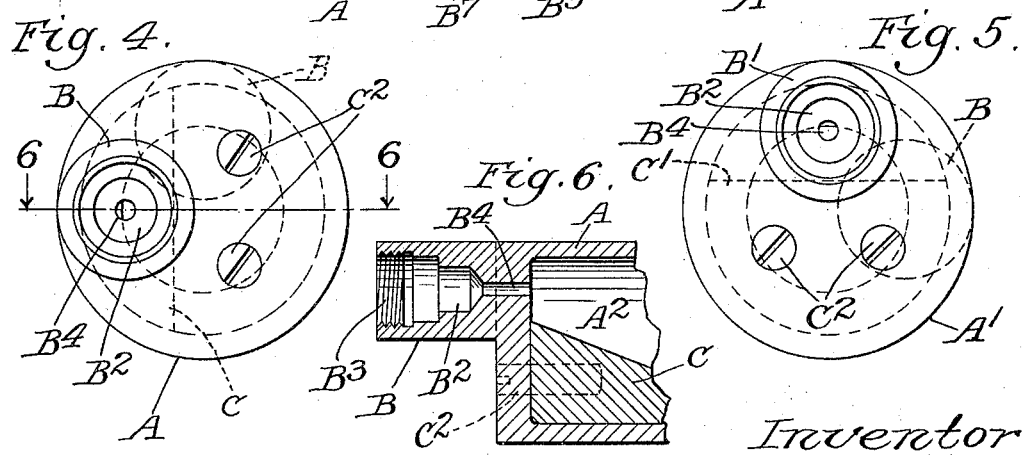
Inventor
Arnold Lack
by Carter
Attorneys.

Patented Mar. 14, 1933

1,901,175

UNITED STATES PATENT OFFICE

ARNOLD LACK, OF BELOIT, WISCONSIN, ASSIGNOR TO H. H. SHOCKEY, OF CHICAGO, ILLINOIS

CRANK SHAFT

Application filed April 1, 1931. Serial No. 526,838.

My invention relates to improvements in crank shafts especially adapted for use with rotary engines and has for one object to provide a new and improved type of hollow, light, counterbalanced crank shaft and also to provide a method of manufacture thereof. Other objects will appear from time to time throughout the specification and drawing.

My invention is illustrated more or less diagrammatically in the accompanying drawing, wherein—

Figure 1 shows the two separate crank shaft forming elements ready for assembly;

Figure 2 shows the crank shaft blank after it has been assembled and welded;

Figure 3 shows the crank shaft in finished condition;

Figure 4 is an end elevation with the crank shaft shown in Figure 3 seen from the left side;

Figure 5 is an end elevation with the crank shaft shown in Figure 3 seen from the right hand side;

Figure 6 is a detail section along the line 6—6 of Figure 4.

Like parts are indicated by like characters throughout the specification and drawing.

A is the short section, $A^1$ the long section of a two part welded crank shaft. The short section A has at one end a cylindrical pocket $A^2$, the pocket being bounded at one end by the solid end of the crank shaft, at the other end by an inwardly extending flange $A^3$ whose internal diameter is less than the internal diameter of the pocket $A^2$. As will hereinafter appear, the main bearing surface on the crank shaft is formed about the short section. $A^4$ is a cylindrical pocket in the long section of the crank shaft, the internal diameter of which is the same as the internal diameter of the pocket $A^2$. Extending toward the end of the crank shaft is a tubular passage or aperture $A^5$ of lesser diameter than the pockets $A^2$ and $A^4$. The end of the crank shaft surrounding the tubular passage $A^5$ is reduced in diameter as at $A^6$ to provide a male member of substantially the same outside diameter as the inside diameter of the flange $A^3$ and the length of this male member is substantially equal to the width of the flange $A^3$. The ends of the members A and $A^1$ in opposition as indicated in Figure 1 are tapered as indicated at $A^7$ so that when the male member penetrates the female member as indicated in Figure 2, there is an annular space provided which may be filled by welding material as indicated at $A^8$ when the two parts are welded together, the welding together of the two parts as indicated in Figure 2 providing the crank shaft blank upon which subsequent machine work may be done.

Referring now to Figure 3, it will be understood that the solid mass of material at each end of the crank shaft, beyond the pockets $A^2$ and $A^4$ is, after the shaft has been welded together, turned down to provide crank pins B and $B^1$ at opposed ends of the shaft. These two pins are identical except for their position with respect to the shaft and each pin is substantially tangent to the outer periphery of the crank shaft, and the diameter of each pin is just a little less than the radius of the crank shaft and the two pins are angularly spaced 90° as indicated. Each pin is centrally apertured as at $B^2$, the outer portion of said aperture being internally threaded as at $B^3$ to permit the attachment of the cover plate to hold a connecting rod on the crank pin. A drilled passage $B^4$ extends inwardly from each pocket $B^2$ to the hollow inside of the crank shaft. The central portion of the crank shaft between the weld and the pocket $A^4$ is cut thereon an integral pinion $B^5$, the pinion teeth being bounded at each end by grooves $B^6$. That part of the face of the crank shaft which is in line with the weld $A^8$ is peripherally channelled as at $B^7$ so that the weld with any different mechanical or chemical characteristics resulting from the welding action will not come in contact with the bearing support in which the crank shaft may be mounted for rotation.

The hollow crank shaft is counter-balanced with respect to the eccentric or asymmetrical weight of the crank pin at either end by means of counter-balance weights C and $C^1$. These counter-balance weights are held in the pockets $A^2$ and $A^4$ respectively by means of screws $C^2$ which penetrate the ends of the crank shaft and engage the counterbalanced weights. These counter-balanced weights are formed of lead or other similar plastic metal which is introduced in proper quantity in molten condition either through the passage $B^4$ or through passages $C^3$ and $C^4$ in that part of the crank shaft which does not come in contact with any working part. When this molten metal is introduced, the crank shaft is held in proper position such that the path of molten metal will find its level in the correct place in the hollow crank shaft and will there solidify surrounding the holding screws and locking itself properly in position.

The process involved, namely, first forming the two separate apertured or pocketed crank shaft segments, then interlocking them and welding them together, then machining the outside of the hollow closed end tube thus formed to proper size and shape and then introducing the plastic molten metal counter-balanced weights after the crank has been finished, makes it possible to produce a crank shaft of maximum strength and minimum weight and also makes it possible to use material such as nitro-alloy and the like which can be easily and conveniently handled, the job has been completed without danger of warping or changing to an unsatisfactory extent, size or shape of the various elements.

I claim:

1. A crank shaft comprising an elongated hollow cylindrical member closed at both ends, crank pins projecting longitudinally from each closed end and parallel with the longitudinal axis of the shaft, a gear on the crank shaft, the crank shaft having cylindrical bearing surfaces at each side of the gear and between it and the crank pins, the outside diameters of the gear and both bearing surfaces being substantially the same, the inside diameter of the hollow portion of the shaft being greater at each end adjacent the bearing surfaces than it is centrally adjacent the gear, counterbalance weights of different material than the crank shaft contained within the hollow interior of the shaft, one associated with each crank pin.

2. A crank shaft comprising an elongated hollow cylindrical member closed at both ends, crank pins projecting longitudinally from each closed end and parallel with the longitudinal axis of the shaft, a gear integral with the crank shaft, the crank shaft having cylindrical bearing surfaces, the outside diameters of the gear and both bearing surfaces being substantially the same, the inside diameter of the hollow portion of the shaft being greater at each end adjacent the bearing surfaces than it is centrally adjacent the gear, counterbalance weights of different material than the crank shaft contained within the hollow interior of the shaft, one associated with each crank pin, a part of each counterbalance weight being located in that part of the hollow portion of the crank shaft of large diameter.

3. A crank shaft comprising an elongated hollow cylindrical member closed at both ends, crank pins projecting longitudinally from each closed end and parallel with the longitudinal axis of the shaft, a gear on the crank shaft, the crank shaft having cylindrical bearing surfaces at each side of the gear, the outside diameters of the gear and both bearing surfaces being substantially the same.

4. A crank shaft comprising an elongated hollow cylindrical member closed at both ends, crank pins projecting longitudinally from each closed end and parallel with the longitudinal axis of the shaft, a gear integral with the crank shaft, the crank shaft having cylindrical bearing surfaces at each side of the gear, the outside diameters of the gear and both bearing surfaces being substantially the same.

Signed at Chicago, county of Cook and State of Illinois, this 26 day of March 1931.

ARNOLD LACK.